Patented Nov. 4, 1930

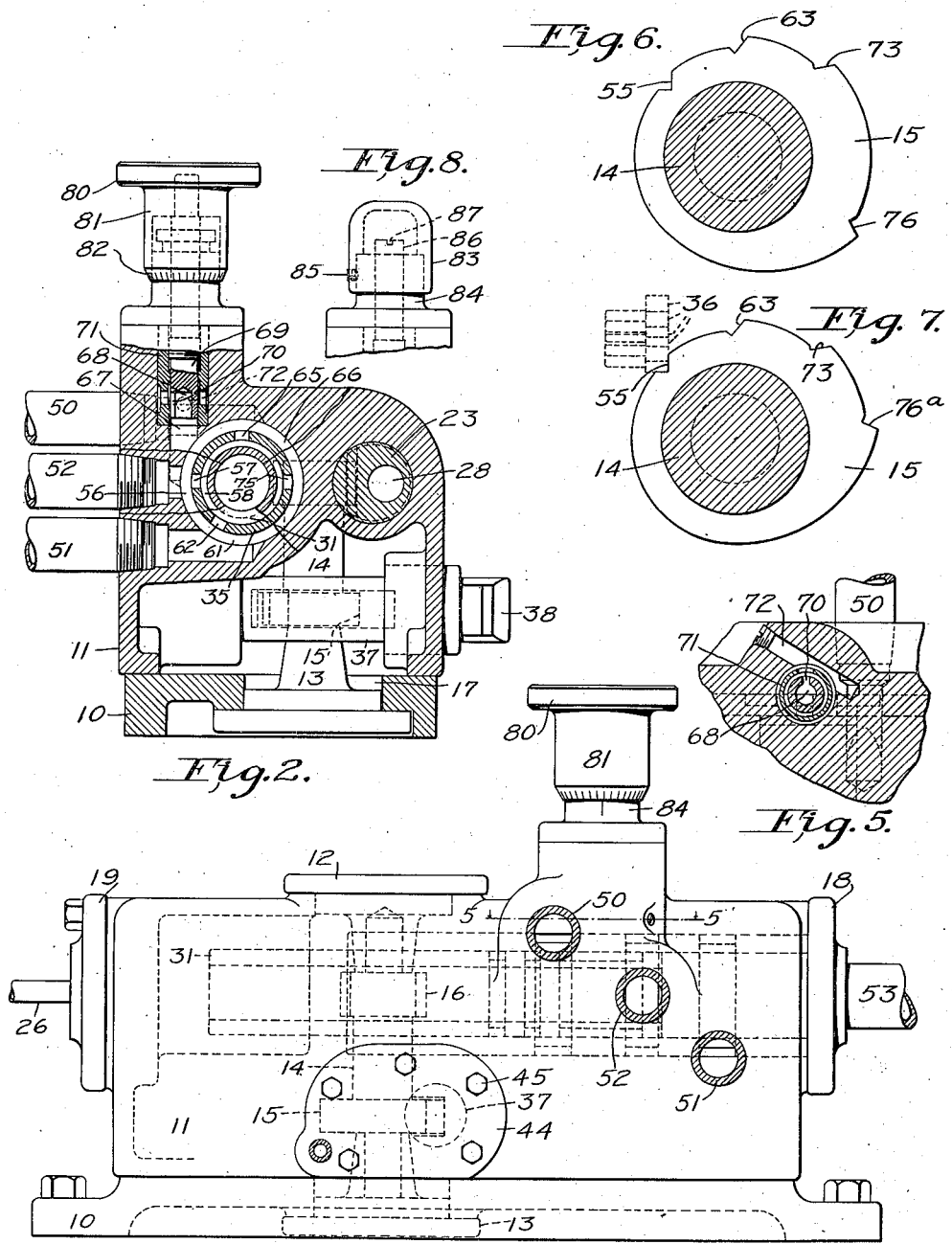

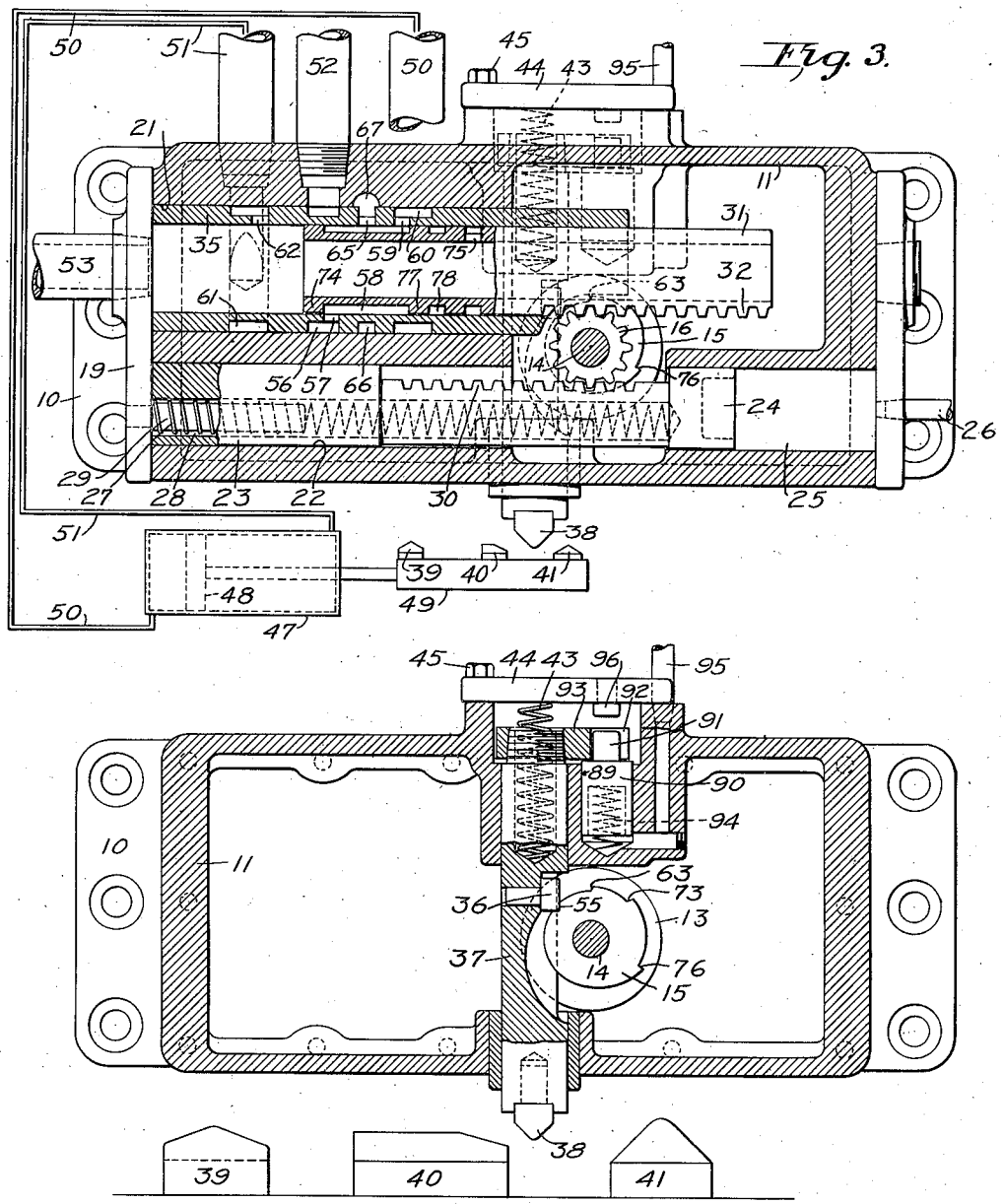

1,780,471

UNITED STATES PATENT OFFICE

ROBERT M. GALLOWAY AND ROBERT A. SCHAFER, OF RICHMOND, INDIANA, ASSIGNORS TO THE NATIONAL AUTOMATIC TOOL COMPANY, OF RICHMOND, INDIANA, A CORPORATION OF INDIANA

HYDRAULIC CONTROL VALVE UNIT

Application filed July 20, 1928. Serial No. 294,138.

The present invention is concerned with a complete self-contained control valve unit constructed in such a manner as to be substantially leak proof. This valve unit is especially adapted for motors of the servo-type as employed e. g. in machine tools for the operation of a movable head carrying either cutting tools or a work piece. Such a type motor in connection with a machine tool is shown in co-pending application, Serial No. 237,160, filed December 2, 1927. It has been found that, with an adequate and dependable control, fluid pressure means may be employed to operate a translatable tool element of this type through a series of forward and reverse movement and at slow and rapid speeds as desired depending upon the type of work and the particular operations to be performed.

Fluid propulsion means have been designed for this purpose for a great many years previous hereto but difficulties have been experienced in controlling the fluid to cause the propulsion means to operate in an accurate and efficient manner. The control means in most cases have proven unsatisfactory for various reasons, chiefly resulting from the fact that they were complicated and cumbersome and thereby inaccurate and unreliable in their operation.

We have in the course of our study of this problem developed valve means and operating mechanism therefor which have obviated most of these objections and which operate in a manner to render fluid operation of tools of this type fully practical.

The present invention is particularly concerned with valve control means of this type wherein a complete unit incorporating a slide valve and the entire actuating mechanism therefor are provided completely enclosed and within a casing which casing is adapted to be removably mounted upon any one of the special types of this general class of machines and variably controlled in a manner corresponding with the particular cycle of operations required in the machine upon which it is installed.

The unit presents a very compact and well appearing construction occupying a comparatively small space and adapted to be mounted on a machine tool without material sacrifice of the general compact appearance of the tool itself.

The unit is such as to be readily adapted to various types of machines thereby presenting an advancement in standardization and a corresponding economy in manufacture.

As a further primary object of this invention the slide valve member and its operative connections are completely enclosed in a casing the interior of which in the main is connected to the exhaust. Enclosed within the casing is a fluid pressure operated piston adapted through proper mechanism to slide the valve in one direction and to set it in an initial operative position. The valve is urged in the opposite direction by an impositive means consisting of a spring, such movement being resisted by interference means comprising a stepped cam and locking means engageable therewith. Operation of the locking means permits the valve to be successively moved throughout a cycle of operation. By reason of the fact that this mechanism is entirely enclosed within the casing there are no valve stems and like mechanism which project through the casing and which are exposed to the extremely high pressures employed in power fluids for devices of this nature. The unit is therefore entirely free from annoying leakages often attendant upon devices of this nature.

As a further object of the invention the parts are so constructed and relatively arranged as to present a well balanced organization and having its major dimension normally extending in the same direction as the general outline of the machine upon which it is mounted. The balanced construction includes a rotary shaft having symmetrically arranged on one side thereof and operatively connected thereto a slide valve, and on the opposite side a second slide member adapted to receive the fluid pressure for operation in one direction and a spring extending into the hollow interior thereof for urging it in the opposite direction.

A further object is concerned with the provision of means whereby the arrangement may be quickly and easily modified to result in different cycles of operation in accordance with the particular adaptation and type of work to be performed. This alternative operation is rendered possible by a construction which permits of the ready removal of the stepped cam means and the substitution of others having a different configuration which causes a correspondingly different ultimate operation of the fluid motor.

A still further object of the invention resides in the provision of an emergency trip means of a particular construction which may be operated at will to permit the valve to move to the reversed position the normal automatic operation being operative thereafter to cause the mechanism to come to rest at the completion of the reverse movement.

Other objects and advantages will be in part indicated in the following description and in part rendered apparent therefrom in connection with the annexed drawings.

To enable other skilled in the art so fully to apprehend the underlying features hereof that they may embody the same in the various ways contemplated by this invention, drawings depicting a preferred typical construction have been annexed as part of this disclosure and, in such drawings, like characters of reference denote corresponding parts throughout all the views of which:—

Fig. 1 is a view in elevation of the complete unit. Fig. 2 is a transverse sectional view thereof, portions being shown in different sections adjacent the valve to more fully illustrate the various fluid passages. Fig. 3 is a horizontal sectional view including a diagrammatic showing of connections to a fluid power cylinder. Fig. 4 is a further horizontal section and taken at a lower elevation than Fig. 3, showing in addition the relation of the trip cams normally mounted on the translatable machine tool element. Fig. 5 is a partial sectional view taken on approximately line 5—5 of Fig. 1 showing the connection between particular fluid conduits. Fig. 6 is a view of one type of stepped cam adapted to control the valve in a manner to by-pass the fluid from the source at the end of a cycle. Fig. 7 shows a different type adapted to control the valve in a correspondingly different manner and Fig. 8 shows a modification of the adjustable valve mechanism for the slow feed.

The general construction includes a base portion 10 adapted to be readily mounted on a machine tool or other device wherein a movable member is to be controlled in accordance with a special cycle. Bolted to the upper surface of the base 10 is the housing 11 within which are mounted the various operating mechanisms to be described. Two opposed bearing members 12 and 13 are shown which support the rotatable shaft 14 having mounted thereon, or integral therewith as desired, the cam 15 and the rack pinion 16. These bearings are secured in place by suitable screw bolts and are removable to permit the ready removal of the shaft 14 together with the cam 15 and gear 16 for a purpose to be later described, such means being easily removed through the opening 17 shown in Fig. 2. The housing 11 is provided with two end plates 18 and 19 secured in place by suitable screw bolts.

Within the housing are two longitudinal bores 21 and 22 symmetrically arranged on opposite sides of the rotary shaft 14. Within the bore 22 the member 23 is slidably mounted having at one end thereof the piston 24 slidable in the extension 25 of the bore 22. Admission of air to the cylinder 25 through the pipe 26 serves to force the slide member 23 to the left in Fig. 3, such movement being resisted by the spring 27 located within a bore 28 extending for substantially the entire length of the slidable member 23, said spring being held in position by the stud 29 fixed in the end plate 18. The spring constitutes an impositive means for constantly urging the valve in one direction as governed by a stop means hereinafter described. A rack 30 on the central reduced portion of the slide member 23 meshes with the pinion 16 and thereby serves to operate the valve member 31 through the rack 32 engaging with the pinion 16.

The bore 21 has fitted therein the valve sleeve 35 the periphery of the sleeve having various fluid passages therein for the suitable distribution of fluid. The valve 31 is slidably mounted within the sleeve 35 and has passages therein cooperative with the passages in the valve sleeve.

The valve having been set in the position shown in Fig. 3 by admission of fluid to the cylinder 25, return movement of the valve under the influence of the spring is prevented by an interference and stop means now to be described and which includes the cam 15 and a series of notches therein adapted to be engaged by the stop 36 secured in the trip slide 37. The trip slide 37 is mounted in a suitable transverse opening in the casing. The slide 37 has a trip cam 38 at the outer end thereof adapted to be engaged by trip dogs movable in timed relation with the translated element. Trip dogs of this nature are shown at 39, 40 and 41 in Fig. 4, such dogs, in the case of a machine tool, being normally mounted on and movable with a slidable tool head. The slide 37 is normally urged toward the cam by means of the spring 43 bearing against plate 44 held on the casing 11 by suitable cap screws 45.

A typical cycle of operations will now be described. In Fig. 3 is shown in diagrammatic manner a cylinder 47 having slidably mounted therein the piston 48 connected to member 49 exemplifying a slidable member such as a machine tool head carrying a work piece or cutting tool. The dogs 39, 40 and 41 shown in Fig. 4 are movable therewith. The pipe 50 leading from the valve is connected with the forward end of the cylinder and the pipe 51 with the rear end thereof. Pipe 52 leads from a source of hydraulic fluid such as a pump normally mounted on a machine tool and constantly operated to supply hydraulic fluid. Pipe 53 leads to a reservoir from which fluid may be drawn by the pump.

The present valve organization is designed to control the fluid motor in such a manner as to impart a cycle of movements to the member 49 consisting of first, a rapid forward movement until the tool engages the work; second, a slow feeding traverse; third, a rapid reverse movement and fourth, a position of rest. The valve is shown in Fig. 3 in the first position immediately after it has been set by admission of fluid to the cylinder 25 to permit stop 36 to engage in notch 55 wherein the valve is held in the position shown in Fig. 3. In this position fluid enters from the pipe 52 and flows through the annular groove 56 through ports 57 into the annular passage 58 in the valve 31 and back through ports 59 and annular groove 60 in the sleeve which communicates with the pipe 50 leading to the forward end of the cylinder 47.

During this period the rear end of the cylinder is exhausting through the pipe 51 to the annular groove 61 in the sleeve and ports 62 out the hollow interior of the sleeve to the pipe 53 and back to the reservoir.

As the member 49 moves to the right the trip cam 38 is engaged by the dog 40 releasing the cam 15 and permitting it to rotate until the shoulder 63 engages the stop 36. This results in the slow working traverse.

In this position the valve 31 having been moved a slight amount to the left fluid from the pump now passes from annular passage 58 through openings 65 into the annular groove 66, passage 67, the hollow interior 68 of the adjustable valve 69, through the longitudinal slot 70 therein and openings in the sleeve 71, cross-bore 72 and to the pipe 50 leading to the forward end of the cylinder 47. The slide valve 31 having been moved to the left a sufficient amount to close the opening 59 the fluid supplied to the forward end of the cylinder is consequently reduced in amount dependable upon the opening of the adjustable regulating valve 69. During this portion of the cycle the rear end of the cylinder continues to exhaust as previously described during the rapid forward traverse.

As the member 49 proceeds on its slow forward traverse the dog 39 engages the trip cam 38 releasing the cam 15 permitting it to rotate until the shoulder 73 engages the stop 36. The valve 31 has now moved far enough to the left so that the annular ring 74 has passed the opening 62 in the sleeve and in this position high pressure fluid passes therethrough from the annular passage 58 in the valve member and out the pipe 51 to the rear end of cylinder 47. The opposite end of the cylinder is now open to the exhaust through port 59 in the sleeve member, opening 75 in the valve member, and through the hollow interior thereof to the reservoir. The direction of movement of the member 49 is thereby reversed and movement in the reverse direction continues at a rapid rate until the trip dog 41 engages the trip cam 38 permitting the cam 15 to rotate until the shoulder 76 engages the stop 36. This permits the valve member 31 to move far enough to the left such that the opening 75 of the valve member communicates with the opening 57 permitting the pump to discharge directly to the exhaust during the period that the tool head remains at rest pending the initiation of a new cycle.

The above series of movements constitutes a complete cycle of operations and the actuated member remains at rest in this position until a new cycle is initiated by the admission of air to the cylinder 25. The described cycle of operations is typical of that required in a machine tool but as may be readily understood this cycle may be required to be varied in accordance with the particular operation to be pursued. The herein described valve unit is adapted to be bodily removed as a whole and applied to any of the various types of general class of machine tools described but as may be understood the operations thereof are often varied and in accordance with the general provisions for standardization and for making the valve unit of a universal application provision is made for readily removing the cam 15 and replacing it my cams of different construction in accordance with the particular cycle to be performed.

As illustrative thereof the cam shown employed in Figs. 3 and 4 is particularly adapted for a single head machine tool or more generally speaking is adapted for a situation where a fluid pump supplies pressure fluid to but one cylinder. Under such circumstances since the head may remain at rest for a substantial length of time it becomes desirable to relieve the pump of a pressure thereon to avoid overheating of the oil which normally would be required to pass through a spring pressed relief valve. The pump in the present case operates free and requires the application of but little power.

If, however, we are dealing with a multiple head machine wherein a pump supplies fluid to more than one cylinder it is necessary at the end of a cycle of any one of the heads that there be no by-pass or relieving of the pressure on the pump in order that the remaining head or heads may be permitted to complete their cycle of operations under full pressure from the pump. In such a case a cam similar to that shown in Fig. 7 may be employed and in which the shoulder 76 is replaced by shoulder 76ª which stops the valve in a position such that the pump is entirely closed off in the final position of rest. This position would be that when the annular groove 78 of the valve member 31 is located opposite the opening 57 in the sleeve.

The substitution of this cam may be readily accomplished by removing the bearing member 13 and withdrawing the shaft assembly 14 and a complete new shaft assembly may be reinserted or if cam 15 is made removable from the shaft the change may be made by applying this cam to the shaft 14.

As an alternative construction particularly concerned with the regulating valve the assembly in Fig. 2 shows a hand grasp 80 rigid with the valve member 69. Rotation of the hand grasp serves through screw threaded means to axially adjust the rectangular opening 70 to expose a corresponding selected portion of its length to the flow of fluid therethrough. The sleeve member 81 integral with the hand grasp 80 is provided with graduation marks to indicate the extent of adjustment. As shown in Fig. 8 however, this construction may be replaced by means whereby the regulating valve may be set to a desired position and casual adjustment thereof prevented by the employment of a cap 83 adapted to fit over the bearing 84 and secured thereon by set screw 85 preventing access to the valve stem 86. Adjustment of the valve is accomplished through the notch 87 adapted for reception of a screw driver.

During the operation of a machine tool emergency cases often arise such as when a cutting tool breaks or in the event of an accident of some nature it becomes extremely desirable to reverse the direction of movement and withdraw the tool head to the retracted position of rest.

The present invention makes provision in a very simple and efficient manner for this operation. This means consists of a fluid cylinder 89 having slidably mounted therein the piston 90, the piston 90 having a projection 91 slidably engaged in a notched opening 92 of the cross-plate 93 threaded on the slide 37. A relatively light spring 94 serves to normally urge the piston 90 toward the plate 93. In the event of an emergency such as that mentioned above fluid is admitted by means of a manually operated valve through the pipe 95 to the cylinder 89. The emergency trip piston immediately moves outwardly until the projection 91 engages the stop button 96 which moves the slide 37 to a position such that the shoulder 73 engages the stop 36 which causes the reverse movement of the actuated tool head. The tool head proceeds on its reverse movement until the trip dog 41 engages the slide 37 and permits the valve to move to the position of rest. The construction as shown and described provides a means for manually throwing the mechanism into reverse position, the operation thereafter being automatically continued to bring it to rest by reason of the loose connection between the elements 93 and 91 which permits the plate 93 and slide 37 to continue to move outwardly after the projection 91 engages the stop button 96.

Any suitable valve means may be employed for admitting air to the cylinders 25 and 89, a very convenient form of valve for this purpose being e. g. a Ross four-way air valve in which a single lever normally occupies a neutral position with both the pipes 26 and 95 open to the exhaust. Rocking of the manual lever in one direction serves to admit air to the pipe 95 whereas rocking of the lever in the opposite direction admits air to the pipe 26. The type of valve described is shown connected up in the above mentioned application Serial No. 237,160.

It may be seen that the above described construction constitutes a very compactly arranged control valve and operating mechanism completely enclosed within a casing, the external connections consisting primarily of fluid pipes whereby leakage which often occurs around slidable valve stems is prevented, such leakages being particularly liable to occur in devices of this nature wherein the pressure of the hydraulic fluid employed is often extremely high. The valve unit as a whole may be readily applied to any type of machine tool and being of relatively long slim proportions is well adapted to be applied to a machine tool merging with the general contour thereof and not presenting any material unsightly projections thereon. The valve member is as shown slidably mounted and likewise the operating member 23 both being of similar proportions and mounted in an opposed manner on opposite sides of the rotary shaft 16 thereby constituting a well balanced construction and of comparatively small inertia whereby the valve is quick and reliable in its operation with a corresponding accurate and efficient operation of the actuated machine tool head.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereof, by Letters Patent of the United States:—

1. A completely enclosed leak proof valve and actuating mechanism comprising a casing, having a plurality of fluid conduits of unequal capacity connected therewith; a valve member slidable in said casing and adapted to control the fluid flow through said conduits; impositive means therein for urging said valve in one direction; fluid pressure means for moving said valve in the opposite direction against said impositive means; interference means for locking said valve in predetermined positions relative to said conduits; and means extending from said casing adapted to be actuated to release said interference means.

2. A complete control unit for fluid motors including a casing and valve means and actuating mechanism therefor enclosed in said casing comprising a piston valve member slidable in a bore formed in said casing, impositive means for urging said valve in one direction, fluid pressure means for moving said valve in the opposite direction against said impositive means, interference means for locking said valve in predetermined positions, and means for tripping said interference means.

3. A complete control unit for fluid propulsion means combining a casing having a valve bore therein; a plurality of fluid conduits connected with said bore; a valve slidable in said bore and operating mechanism for said valve located in said casing comprising, spring means continuously operative to urge said valve in one direction; fluid pressure operated piston means for moving said valve in the opposite direction against said spring means, interference means for locking said valve in predetermined operative positions, and means for tripping said interference means.

4. A control means for fluid motors comprising a casing having a bore therein and fluid conduits connected therewith; a valve slidably mounted in said bore; a rotary shaft; a rack and gear connection between said shaft and slide valve; impositive means tending to move said valve in one direction; means adapted to be intermittently operated to move said valve in the opposite direction against said impositive means; cam means rotatable with said shaft; locking means engageable with said cam means for holding said valve in predetermined operative positions; and means for tripping said locking means.

5. A completely enclosed leak-proof control valve unit comprising a casing having a plurality of fluid conduits connected therewith; a valve member slidably mounted in said casing and adapted to control said conduits; a second member slidably mounted in said casing; a rotary shaft operatively connected to both of said slidable members; impositive means in said casing tending to move said second member in one direction to accordingly move said valve member; and fluid pressure means in said casing intermittently operable to move said second member in the opposite direction against said impositive means.

6. A control valve unit for fluid motors comprising a casing; a shaft rotatably mounted in said casing; a bore extending transversely to said shaft; a plurality of fluid conduits connected with said bore; a valve member slidably mounted in said bore to control the fluid through said conduits; a rack and gear connection between said shaft and valve; a second rack slidably mounted in said casing on the opposite side from said valve and operatively connected to said rotary shaft member; and means for operating said rack to move said valve through its operative positions.

7. A control valve unit comprising a casing; two longitudinal bores therein; a rotary shaft located between and extending transversely to said bores; a valve member slidably mounted in one of said bores; a plurality of fluid conduits connected with said bore and adapted to be controlled by said valve member; a rack and gear connection between said valve member and rotary shaft; a piston mounted in the other of said bores adapted to be moved in one direction by the admission of pressure fluid to the bore; a rack movable therewith and connected to rotate said shaft and thereby move the valve in one direction; and impositive means to move said valve and piston in a direction opposite to the fluid pressure means when said means is inoperative.

8. A completely enclosed control unit for governing the flow of fluid to a fluid servomotor combining a casing; a bore therein; a valve member slidably mounted in said bore; fluid conduits of unequal capacity connecting said bore with one end of said motor and adapted to be controlled by said valve member; and means located within said casing for actuating said valve member to cause the servo-motor to perform a cycle of movements comprising impositive means connected to urge said valve in one direction, fluid pressure means adapted to move said valve in the opposite direction against said impositive means, and to position said valve for the initial movement of the cycle, interference means to lock said valve in predetermined operative positions against said impositive means, and means adapted to be successively actuated by the movement of said motor to trip said locking means to permit the impositive means to move said valve through a series of operative positions.

9. A complete control unit for fluid actuating motors comprising a casing having a longitudinal bore therein; a valve member slidably mounted therein; a plurality of fluid conduits connected to said bore adapted to be controlled by said valve member; a rotary shaft operatively connected to said slide valve; impositive means in said casing operative on said shaft and valve member in one direction; fluid pressure means in said casing operative in a direction opposed to said impositive means and adapted to be intermittently operated to move said valve to an initial operative position; stepped cam means rotatable with said shaft; and a trip member slidable transversely of said casing having stop means engageable with said stepped cam means and adapted to be successively operated by movement of the actuated device to permit a step by step movement of said cam means and valve under the influence of said impositive means.

10. Fluid pressure operating means combining a motor; a source of fluid under pressure; and a valve for controlling the admission and exhaust of fluid to said motor to cause it to be operated through a cycle of movements and back to a position of rest said valve comprising a casing having fluid connections to said motor, to exhaust and to said source of fluid under pressure, a valve member movable in said casing to control said fluid passages, said valve having a plurality of positions corresponding to said position of rest in one of which the source of pressure fluid is closed off and in the other of which it is by-passed to the exhaust, impositive means for operating said valve member, interference means in said casing for locking said valve in predetermined operative positions including said position of rest against said impositive, and means for tripping said interference means, interference means of different types being provided to permit said valve to occupy either position of rest and being readily removable to permit substitution of one for the other.

11. A control valve unit comprising a casing, a valve member therein movable to selected operative positions; impositive means acting on said valve to move it in one direction; releasable stop means; cam means connected to be operated in accordance with the movement of said valve member and adapted to engage said stop means to determine the valve positions, a plurality of said cam means adapted to stop the valve in different positions to accordingly vary the fluid control being provided and being readily interchangeable.

12. A control valve comprising a casing; a plurality of fluid conduits connected therewith; a valve member in said casing adapted to control the fluid through said conduits; means for urging said valve in one direction; stepped cam means connected to be rotated in accordance with the movement of said valve member; releasable stop means adapted to progressively engage said cam means to lock the valve member in corresponding operative positions, a plurality of readily removable interchangeable cam means but differently arranged being provided whereby the operative cycle of said valve may be varied accordingly.

13. A complete control valve unit for fluid motors, combining a casing having a plurality of fluid conduits connected therewith; a valve member therein adapted to control said conduits; and actuating and control mechanism for said member mounted and enclosed within said casing comprising a member slidable in a bore in said casing, a spring engaging with said member to urge it in one direction, a piston rigid with said hollow member and adapted to move said member in the opposite direction against the force of said spring by admission of pressure fluid to said bore, a rotary shaft mounted in said casing, a rack and gear connection between said member and shaft for operating the latter, a connection for operating said valve by the rotation of said shaft, interference means for locking said valve in predetermined positions, and means extending from said casing for releasing said interference means.

In witness whereof, we have hereunto subscribed our names.
ROBERT M. GALLOWAY.
ROBERT A. SCHAFER.